Aug. 20, 1957 V. S. LARSON ET AL 2,803,486
HOOK FOR LOGGING ARCH CABLE
Filed Nov. 12, 1954
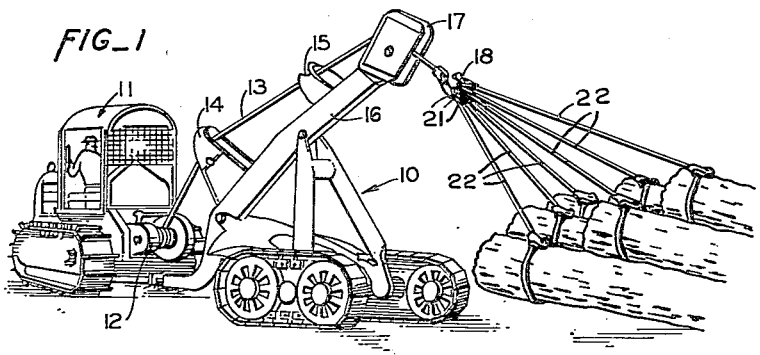
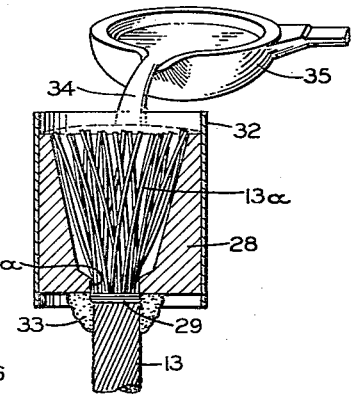
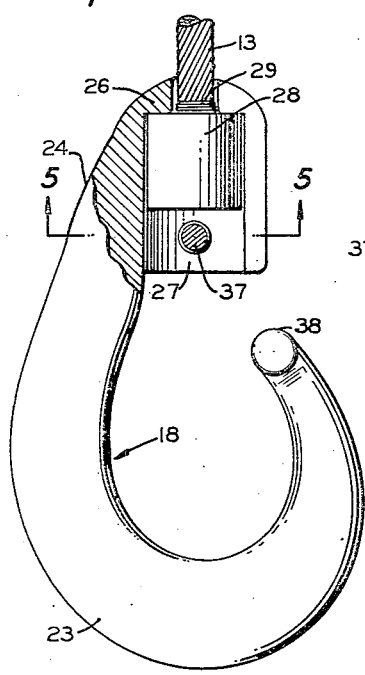
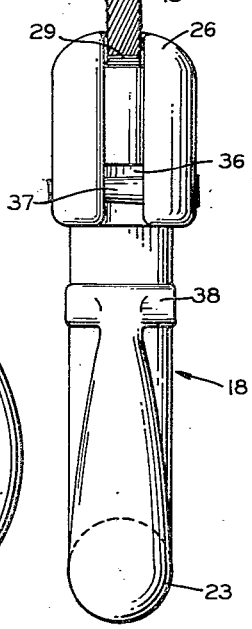
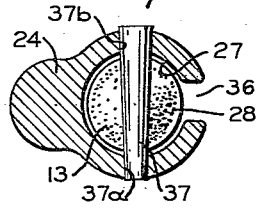
INVENTORS
VICTOR S. LARSON
DONALD E. LARSON
BY
Hansen and Lane
ATTORNEYS United States Patent Office 2,803,486
Patented Aug. 20, 1957

2,803,486
HOOK FOR LOGGING ARCH CABLE

Victor S. Larson and Donald E. Larson, San Jose, Calif.

Application November 12, 1954, Serial No. 468,200

1 Claim. (Cl. 294—78)

The present invention relates to a cable hook, and pertains more particularly to a hook for use on the heavy wire ropes or cables of logging arches and similar work.

In the logging of large timber, particularly in the Pacific Northwest, after the trees are felled, and cut into logs of required length, the logs are taken out of the woods by tractors or drag lines. When using tractors, a logging arch, which comprises a tilted boom mounted on crawler type treads and drawn by a crawler type tractor frequently is used. Each log is provided with a short individual cable called a "choker" which is looped around one end of the log with a slip connection provided by an eye splice or socket.

The logs are drawn from the place where they are felled into a position near the arch by a cable, which is operated from a winch on the tractor and runs through a fair lead at the upper end of the arch boom. When several of the logs thus have been assembled near the arch, the chokers are secured by heavy chain slings to a single large hook on the end of the tractor cable. The tractor cable, including the hook of the present invention, and at least a portion of the heavy chain sling then is drawn in through the fair lead by means of the tractor winch to elevate one end of the group of logs, which then are dragged to a loading station where they are loaded on trucks or trains, or are skidded into a stream for transporting to a mill.

It has been the practice heretofore to attach a large hook to the end of the winch cable by means of a conventional eye splice. Such splices require considerable skill to fashion in a workmanlike manner, and may leave projecting ends of wire that offer a considerable physical hazard to workmen working with the device. Such links and splices sometimes fail to pass freely through the fair lead of the arch boom, and causes frequent breakage of the cable at the eye splice.

It is an object of this invention therefore to provide an improved cable hook for the free end of the winch cable of a logging arch, thus eliminating intervening chains and shackles and reducing cable breakage.

It is also an object of the invention to provide a logging arch cable hook that can be easily attached to and detached from the cable without the use of an intervening eye and cable splice.

A further object of the invention is to provide a cable hook that can swivel at its point of connection with the cable without danger of disturbing the lay thereof.

A still further object is to provide a streamlined hook for a logging arch cable that can be dragged easily through underbrush, and that will pass freely through the fair lead of the arch boom without damage to the fair lead, and without danger of being caught and hung up therein.

These and other objects and advantages of the invention are apparent in the following description, and the accompanying drawings, wherein:

Fig. 1 is a perspective view of a logging arch having a hook embodying the present invention associated therewith.

Fig. 2 is an enlarged sectional view showing how the arch cable is attached to the hook pivot.

Fig. 3 is a side elevational view, slightly reduced from the scale of Fig. 2, showing the end portion of the arch cable attached to the hook, a portion of the hook being broken away.

Fig. 4 is a front elevational view of the parts shown in Fig. 3.

Fig. 5 is a sectional view taken along line 5—5 of Fig. 3.

In the drawings, Fig. 1 shows a conventional crawler type logging arch 10 drawn by a crawler type tractor 11 having a winch 12 mounted thereon. A cable 13 from the winch passes through usual guides 14 and 15 on the boom 16 of the arch and through a fair lead 17 on the outer end of the boom. Customarily this winch cable is of approximately 1¼ inch diameter and the previous practice has been to secure an eye type hook to the cable by means of an eye splice formed in the outer end of the winch cable, an operation consuming a considerable amount of time by a skilled rigger, and using approximately seven feet of cable for its accomplishment.

In the present invention, a hook 18 is attached to the outer end of the winch cable 13 for hooked engagement with the usual eye splices 21 formed in the ends of a plurality of choker cables 22 in a conventional manner.

As shown in Fig. 3, the hook 18, consists of a hook portion 23 and its shank 24 which are faired into each other to provide a smoothly curved external contour which practically precludes the possiblity of the hook catching in underbrush and the like in an undesired manner. The upper end 26 of the shank terminates in curved surfaces that will pass smoothly through the fair lead 17 without damage thereto.

A swivel connection is formed between the winch cable 13 and the hook 18 through the medium of a socket 27 formed in the shank and a swivel cable connector 28 rotatably mounted in the socket.

The manner of attaching the swivel body 28 to the winch cable 13 is not new, but is shown in Fig. 2, wherein it can be seen that a wire serving 29 has been wrapped about the cable at the desired point, and the end of the cable has been inserted through a hole 28a in the bottom of body 28. The free ends of the cable wires 13a have been unlaid and flared outward to occupy a conical socket 32 formed in the body. The bottom opening 28a is sealed with a dam 33 of suitable plastic substance such as clay, and a retaining shell or sleeve 32 is fitted closely around the member 28 to extend upwardly above the upper end thereof. After the flared wire end portions 13a are thoroughly cleaned in a usual manner for babbiting, molten babbit 34 or other suitable material is poured about the wires from a ladle 35, in sufficient quantity to fill the socket 32 and to bond with the wire end portion 13a therein.

It is preferred that a swivel body 28 be applied one to each end of the winch cable. Then, when the outer or free end of the winch cable begins to show serious signs of wear, the cable may be reversed end for end. Since the outer end portion of the cable is the only part which is subjected to severe wear; this procedure practically doubles the life of the cable.

After the swivel body 28 has been fixed to the cable 13, the cable may be inserted laterally through a slot 36 formed in the side of the hook shank 24, and the swivel body 28 slid axially into place within the socket 27. To prevent the swivel body 28 from inadvertently slipping from the socket 27, a tapered securing pin 37 (Figs. 3, 4 and 5) is inserted in correspondingly tapered axially aligned holes 37a and 37b (Fig. 5) provided therefor in opposite sides of the hook shank 24. The pin 37 preferably is of a length to fit practically flush with the sides of the hook shank to avoid catching on brush or other objects as the hook 18 is drawn in by the winch 12.

A cross bar 38 may be formed transversely across the point of the hook 23 in a usual manner.

While we have illustrated and described a preferred embodiment of the present invention, it will be understood, however that some changes and modifications may be made in the details thereof without departing from the spirit and scope of the invention as set forth in the appended claim.

Having thus described the invention, what we claim as new and desire to protect by Letters Patent is defined in the following claim.

We claim:

A cable hook for a logging arch having a shank of smoothly rounded external contours formed integrally therewith, a cylindrical socket in the shank, a swivel body of lesser length than the socket, and of greater diameter than the cable rotatably mounted in the socket, a wire cable metallically bonded into the body and extending through the base of the socket, and a securing bolt mounted transversely of the shank beyond the swivel body and flush with the exterior of said shank to retain the swivel body against axial displacement from the sockets, the shank having a cable receiving slot extending lengthwise thereof and opening into the socket, said slot being of a width to receive the cable but less than the diameter of said swivel body.

References Cited in the file of this patent

UNITED STATES PATENTS

| | | |
|---|---|---|
| 127,177 | Luther | May 28, 1872 |
| 1,451,138 | Holliday | Apr. 24, 1923 |
| 1,464,162 | Wirkkala | Aug. 7, 1923 |
| 1,598,701 | Bell | Sept. 7, 1926 |
| 1,723,086 | Smith | Aug. 6, 1929 |
| 2,236,022 | Frevor | Mar. 25, 1941 |
| 2,571,052 | Mount | Oct. 9, 1951 |
| 2,637,591 | Maxfield | May 5, 1953 |